F. GROVER.
INTERMITTENT DRIVE FOR SWEETMEAT WRAPPING MACHINES.
APPLICATION FILED JAN. 12, 1916.

1,195,672.                                   Patented Aug. 22, 1916.

Inventor
Frederick Grover
By
his Attorneys

UNITED STATES PATENT OFFICE.

FREDERICK GROVER, OF LEEDS, ENGLAND, ASSIGNOR TO THE FORGROVE MACHINERY COMPANY LIMITED, OF LEEDS, ENGLAND.

INTERMITTENT DRIVE FOR SWEETMEAT-WRAPPING MACHINES.

1,195,672.  Specification of Letters Patent.  Patented Aug. 22, 1916.

Application filed January 12, 1916. Serial No. 71,605.

*To all whom it may concern:*

Be it known that I, FREDERICK GROVER, a subject of the King of Great Britain, residing at Leeds, in the county of York, England, have invented certain new and useful Improvements in Intermittent Drives for Sweetmeat-Wrapping Machines, of which the following is a specification.

This invention relates to the means employed for imparting rotary motion to the ring-like carrier of sweetmeat wrapping machines by which the sweetmeat and its wrapper are rotated during the time the ends of the wrapper are held by the stationary grippers for effecting the inclosing of the sweetmeat; my object being to provide the ring-like carrier with a driving mechanism of such a construction as to be much more simple in character than the mechanisms hitherto proposed for the same purpose.

According to my invention, the rotative ring-like carrier is driven from the main shaft of the machine through the medium of an intermediate friction-clutch comprising in combination, a fixed friction disk, a a spring-pressed pulley adapted to drive the ring-like carrier and being normally held stationary by face contact with the fixed friction disk, and a constantly driven pulley adapted to be intermittently moved by a cam mechanism so as to bring its face against the face of the spring-pressed pulley and remove it from engagement with the fixed friction disk and simultaneously through the friction set up between the contacting faces of the two engaged pulleys impart rotary motion to the spring-pressed pulley which then drives the ring-like carrier.

Figure 1:
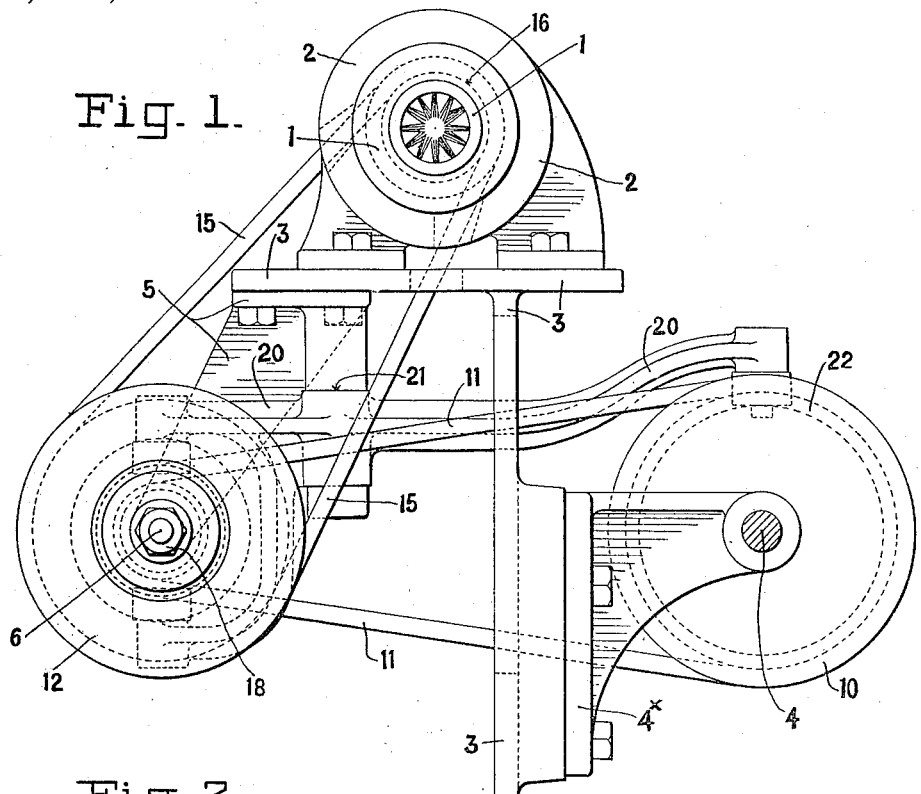
Figure 2:
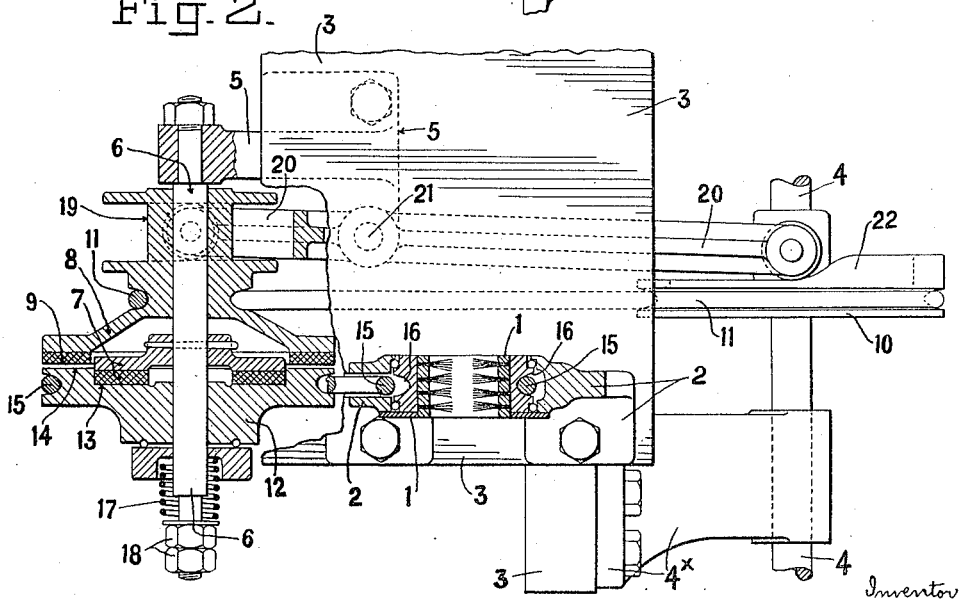

The invention will now be described with reference to the example of construction shown in the accompanying drawings; wherein:

Figure 1 is a side elevation and Fig. 2 a sectional plan of a portion of a wrapping machine, showing my improved mechanism for imparting rotary motion to the ring-like carrier.

In the drawings, 1 is the ring-like carrier revolubly mounted in the head 2 fixed to the frame 3 of the machine; and 4 is the main shaft of the machine carried in a bracket 4× fixed to the frame 3.

According to my invention I fix to the frame 3 of the machine, adjacent to the head 2 of the rotative ring-like carrier 1, a bracket 5 carrying a stationary spindle or short shaft 6 on which is fixed a friction disk 7, and at one side of the fixed friction disk 7 and on the shaft 6 is loosely mounted a pulley 8 formed with an end friction face 9 and which is driven from a pulley 10 situated on the main shaft 4 through a band or belt 11, while at the opposite side of the fixed friction disk 7 and on the shaft 6 is loosely mounted a pulley 12 formed with two end faces 13, 14 and being fitted with a band or belt 15 which is passed around a pulley 16 formed on the rotative ring-like carrier 1; which pulley 12 is held with its end face 13 up against the face of the fixed friction disk 7 through the medium of a spiral spring 17 situated around the shaft 6 and which is held in compression between the boss of the said pulley 12 by providing adjusting nuts 18 located on the outer end of the said shaft 6. The friction faced pulley 8 driven from the main shaft 4 is formed with a grooved collar 19 with which is engaged the outer or short arm of a double-ended lever 20 pivoted at 21 on the bracket 5, while the inner or longer arm of the said lever 20 is adapted to be engaged by an actuating-cam 22 provided on the main shaft 4 in such a manner as to impart an intermittently to-and-fro sliding movement to the said driven pulley 8 on its shaft 6 and so bring its end friction face 9 into and out of contact with the end face 14 of the other pulley 12 situated on the same shaft 6 and which drives the ring-like carrier 1.

The spiral spring 17 situated on the shaft 6 outside the pulley 12 which drives the ring-like carrier 1 tends to keep the end face 13 of the said pulley 12 up against the face of the fixed friction disk 7 on the shaft 6 and so hold it stationary; while on the oppositely situated driven pulley 8 being moved inward through the medium of its cam-actuated lever 20, its end friction face 9 is caused to engage the end face 14 of the spring-pressed pulley 12 and withdraw it from contact with the fixed friction disk 7 and simultaneously, through the friction set up between the contacting faces 9, 14 of the two pulleys 8, 12, cause the spring-pressed pulley 12 to be rotated and through the band or belt 15 to impart the desired rotary motion to the ring-like carrier 1. When the cam-actuated lever 20 withdraws the driven pulley 8, its friction face 9 leaves the end face 14 of the opposite pulley 12 and so allows the end face 13 of the pulley 12 to instantly make contact with the fixed friction disk 7 through the medium of the spring 17, whereby the said pulley 12 is brought to a standstill almost instantaneously.

The duration of time the contacting faces 9, 14 of the two pulleys 8, 12 are engaged is made such as to impart the required number of revolutions to the ring-like carrier 1 for effecting the twist of the wrapper, and the movement of the sliding pulley 8 is thus timed by the cam 22 to allow its face 9 to remain in contact with the end face 14 of the pulley 12 to be driven for the duration required to effect the twisting of the wrapper and then be released to allow of the forward feed of the wrapper tube and subsequent article to be wrapped. In this way, the constantly driven pulley 8 is caused to intermittently rotate the spring-pressed pulley 12 which drives the ring-like carrier 1, and the rotary motion so imparted to the said carrier 1 is always in one direction of rotation and for the duration of time desired to effect the twisting of the wrapper.

What I claim as my invention and desire to secure by Letters Patent is:—

A driving mechanism for the ring-like carrier of sweetmeat wrapping machines, comprising in combination a stationary short shaft, a friction disk fixed on said shaft, a pulley slidably mounted on the shaft at one side of the fixed friction disk, a ring-like carrier drivably connected to said pulley, a spring adapted to press the slidable pulley up to the fixed friction disk to cause it to be normally held stationary by face contact, a constantly driven pulley slidably mounted on the shaft at the opposite side of the fixed friction disk to that of the spring-pressed pulley, and a cam-actuated mechanism adapted to cause the constantly driven pulley to be intermittently brought into engagement with the spring-pressed pulley and remove it from engagement with the fixed friction disk and simultaneously, through face contact, impart rotary motion to the said spring-pressed pulley to cause it to drive the ring-like carrier.

In witness whereof I have hereunto set my hand in the presence of two witnesses.

FREDERICK GROVER.

Witnesses:
 JOHN JOWETT,
 N. KNAPTON.

Copies of this patent may be obtained for five cents each, by addressing the "Commissioner of Patents, Washington, D. C."